(12) United States Patent
Huang et al.

(10) Patent No.: US 11,457,576 B2
(45) Date of Patent: Oct. 4, 2022

(54) INTELLIGENT IRRIGATION SYSTEM

(71) Applicant: HOMGAR INTERNATIONAL INC, Diamond Bar, CA (US)

(72) Inventors: Zhongdong Huang, Diamond Bar, CA (US); Dun Zheng, Diamond Bar, CA (US)

(73) Assignee: Homgar International Inc, Diamond Bar, CA (US)

( * ) Notice: Subject to any disclaimer, the term of this patent is extended or adjusted under 35 U.S.C. 154(b) by 6 days.

(21) Appl. No.: 16/690,109

(22) Filed: Nov. 20, 2019

(65) Prior Publication Data

US 2021/0137035 A1  May 13, 2021

(30) Foreign Application Priority Data

Nov. 13, 2019 (CN) .......................... 201911107913.2

(51) Int. Cl.
| | | |
|---|---|---|
| *A01G 25/16* | (2006.01) |
| *G05B 19/042* | (2006.01) |
| *H04W 88/16* | (2009.01) |
| *H04W 4/38* | (2018.01) |
| *G01W 1/10* | (2006.01) |
| *G01W 1/14* | (2006.01) |
| *H04L 67/1097* | (2022.01) |
| *H04W 84/10* | (2009.01) |
| *H04W 84/18* | (2009.01) |

(52) U.S. Cl.
CPC ......... *A01G 25/167* (2013.01); *A01G 25/165* (2013.01); *G01W 1/10* (2013.01); *G01W 1/14* (2013.01); *G05B 19/042* (2013.01); *H04W 4/38* (2018.02); *G05B 2219/2625* (2013.01); *H04L 67/1097* (2013.01); *H04W 84/10* (2013.01); *H04W 84/18* (2013.01); *H04W 88/16* (2013.01)

(58) Field of Classification Search
CPC .... A01G 25/167; A01G 25/165; A01G 25/00; G05B 19/042; G05B 2219/2625; G01W 1/10; G01W 1/14; H04W 4/38; H04W 84/10; H04W 84/18; H04W 88/16; H04L 67/1097; H04L 67/12; Y02A 90/10; Y02D 30/70

See application file for complete search history.

(56) References Cited

U.S. PATENT DOCUMENTS

| | | | |
|---|---|---|---|
| 7,020,701 B1 * | 3/2006 | Gelvin ................... | G01D 21/00 250/332 |
| 9,829,871 B1 * | 11/2017 | Goodman ............ | A01G 25/167 |
| 10,613,497 B1 * | 4/2020 | Goodman ............ | A01G 25/167 |
| 10,659,144 B1 * | 5/2020 | Tofighbakhsh ....... | H04W 24/10 |
| 10,699,185 B2 * | 6/2020 | Guan ................... | G06N 3/0454 |

(Continued)

*Primary Examiner* — M. N. Von Buhr
(74) *Attorney, Agent, or Firm* — Bay State IP, LLC

(57) ABSTRACT

An irrigation system that controls the irrigation operations based upon soil irrigation decisions and weather forecasts generated by specific meteorological data, including soil temperature, soil moisture, air temperature, air humidity, air pressure, and rainfall collected by different sensors. The system comprises an irrigation decision module, a soil decision module, an air factor decision module, a rainfall information sensor, an irrigation controller, and a mobile APP. The irrigation system uses low-power radio frequency networking technology to communicate between different modules and devices.

1 Claim, 7 Drawing Sheets

(56) References Cited

U.S. PATENT DOCUMENTS

| | | | |
|---|---|---|---|
| 2004/0015270 A1* | 1/2004 | Addink | A01G 25/16 700/284 |
| 2013/0253713 A1* | 9/2013 | VanWagoner | A01G 25/16 700/284 |
| 2016/0057949 A1* | 3/2016 | Williams | A01G 25/167 700/275 |
| 2016/0150744 A1* | 6/2016 | Lin | A01M 31/002 43/107 |
| 2017/0181389 A1* | 6/2017 | Jain | A01G 27/008 |
| 2017/0303590 A1* | 10/2017 | Cameron | G01P 5/02 |
| 2018/0024271 A1* | 1/2018 | Koch | G01W 1/02 702/3 |
| 2018/0146626 A1* | 5/2018 | Xu | A01G 25/165 |
| 2018/0211156 A1* | 7/2018 | Guan | G06Q 10/06 |
| 2018/0262571 A1* | 9/2018 | Akhtar | G06Q 10/087 |
| 2018/0325050 A1* | 11/2018 | Bye | G05D 7/0676 |
| 2019/0150357 A1* | 5/2019 | Wu | A01C 21/00 |
| 2019/0307084 A1* | 10/2019 | Ersavas | G05B 15/02 |
| 2019/0313590 A1* | 10/2019 | Wlassich | A01G 27/003 |
| 2020/0084520 A1* | 3/2020 | Ham | H04B 17/318 |
| 2020/0177485 A1* | 6/2020 | Shurtleff | H04L 43/08 |
| 2020/0350778 A1* | 11/2020 | Nemecek | G05B 19/18 |
| 2021/0045301 A1* | 2/2021 | Shakoor | G05B 19/042 |
| 2021/0235641 A1* | 8/2021 | Boudreau | A01G 25/167 |

\* cited by examiner

INTELLIGENT IRRIGATION SYSTEM

BACKGROUND OF THE INVENTION

Field of the Disclosure

The invention relates to the field of agricultural automation technology, in particular to a low-power intelligent irrigation system based on radio frequency networking technology.

Description of Related Art

Irrigation is a very common activity in daily life. It can be seen in agriculture, gardens, courtyards and balconies. With the gradual development of technology, the current irrigation equipment has been widely used in the field of irrigation, but most of the irrigation controllers still use single-machine timing irrigation. When the set time is reached, the water valve is automatically opened, and the water valve is automatically closed when the set irrigation duration is reached. Single-machine timing irrigation has reduced the workload of artificial irrigation to a certain extent, but the single-machine timing cannot automatically determine whether the soil moisture is sufficient, whether there is rainfall and the irrigation is not needed, and it is impossible to feedback whether the set timing work is performed, etc., especially when the user is not near the controller, this information is not available and the controller cannot be controlled.

Therefore, there is an irrigation controller using wifi control on the market. This kind of the controllers uses meteorological information on the Internet and can be remotely controlled by the APP. However, because the meteorological information on the Internet is too large, it is often inconsistent with the actual weather of the irrigated area, which may cause misjudgment and misoperation of users or irrigation equipment. In addition, since the wifi device itself consumes a large amount of power, external power supply must be used. Therefore, it is necessary to place a power supply plug near the water supply. On the one hand, there are more restrictions on the installation environment, and on the other hand, the distance between the water and the socket is relatively close, so there are major security risks.

SUMMARY OF THE INVENTION

The invention provides a low-power intelligent irrigation system based on radio frequency networking technology, which can cache the meteorological information uploaded by the soil temperature and humidity sensor, the air temperature, humidity, pressure sensors and the rainfall information sensor in real time, and automatically determine whether the irrigation plan is executed or not.

The invention provides the following technical solutions:

A low-power intelligent irrigation system based on radio frequency networking technology is provided. The irrigation system includes an irrigation decision module, an irrigation controller disposed in an irrigation zone, a soil factor decision module, an air factor decision module; the soil factor decision module submits a soil irrigation decision to the irrigation decision module based on a soil state in the irrigation zone; the air factor decision module submits a weather forecast to the irrigation decision module according to an air state in the irrigation zone; the irrigation decision module is connected to the rainfall information sensor to receive current rainfall; the irrigation decision module determines whether to initiate irrigation operations in the irrigation zone based on the received soil irrigation decisions and the weather forecasts.

In addition, the irrigation system further comprises a rainfall information sensor; the irrigation decision module, the irrigation controller, the soil factor decision module, and the air factor decision module and the rain information sensor form a wireless communication network by radio frequency communication.

In addition, the irrigation system further comprises a rainfall information sensor; the irrigation decision module is connected to the rainfall information sensor to receive current rainfall.

The irrigation decision module includes a wifi smart gateway having a built-in data buffer.

The soil factor decision module includes a soil temperature sensor, a soil moisture sensor, and a wireless communication module; the air factor decision module includes an air temperature sensor, an air humidity sensor, and an air pressure sensor; the air factor decision module monitors and records air temperature, air humidity, and air pressure in the irrigation zone as monitoring data; the air factor decision module generates the weather forecast by analyzing the recorded monitoring data.

The irrigation controller has a built-in timed irrigation plan.

In addition, when the soil moisture in the irrigation zone exceeds an irrigation threshold value, the soil factor decision module submits a soil irrigation decision and soil moisture data to the wifi intelligent gateway, so that the wifi intelligent gateway marks an irrigation zone watering identifier as a no-irrigation zone in the built-in data buffer.

When the soil moisture in the irrigation zone does not exceed the irrigation threshold value, the soil factor decision module submits the soil irrigation decision and soil moisture data to the wifi intelligent gateway, so that the wifi intelligent gateway marks the irrigation zone watering identifier as an allowed irrigation zone in the built-in data buffer.

The weather forecast submitted by the air factor decision module to the irrigation decision module includes current air temperature, current air humidity, current air pressure, and rain forecast indicator of the irrigation zone.

The wifi smart gateway caches the weather forecasts, the current rainfall, the soil moisture data, and the soil irrigation decisions; the irrigation controller have a built-in timed irrigation plan.

In addition, a settable value of the rain forecast indicator includes sunny within 6 to 24 hours or stormy within 6 to 24 hours; when the air factor decision module detects that an ambient humidity of the irrigation zone is less than 40% for six hours, the air factor decision module sets the rain forecast indicator in the submitted weather forecast to be sunny within 6 to 24 hours.

When the air factor decision module detects that an ambient air pressure in the irrigation zone has dropped by more than 3 hPa within six hours, the air factor decision module sets the weather forecast indicator in the submitted weather forecast to stormy within 6 to 24 hours.

In addition, when the rain forecast indicator in the weather forecast is sunny, the wifi smart gateway does not consider the soil moisture data and the content of the soil irrigation decision, when a timed task of the timed irrigation plan reaches an execution time, it sends an instruction to the irrigation controller to start watering operation.

When the rain forecast indicator in the weather forecast is stormy, if the irrigation zone watering identifier is the allowed irrigation zone, when the timed task of the timed irrigation plan reaches the execution time, the wifi intelligent gateway sends an instruction to the irrigation controller to start watering operation.

When the rain forecast indicator in the weather forecast is stormy, if the irrigation zone watering identifier is the no-irrigation zone, when the timed task of the timed irrigation plan reaches the execution time, the wifi intelligent gateway sends an instruction to the irrigation controller to not implement the current timed irrigation plan.

When the wifi smart gateway detects that the current rainfall exceeds 10 mm by the rain information sensor, when the timed task of the timed irrigation plan reaches the execution time, the wifi smart gateway sends an instruction to the irrigation controller to not execute the current timed irrigation plan.

In addition, the wifi smart gateway is connected to a cloud platform of an Internet, and uploads the cached weather forecast, current rainfall, soil moisture data and soil irrigation decisions to the cloud platform to form storage data.

The storage data further includes an irrigation state, an irrigation plan, a water consumption amount per irrigation, weather information, and soil state information; the storage data of the cloud platform is configured to be remotely viewed through a mobile phone APP.

In addition, the mobile phone APP is provided with an interactive interface for adjusting the irrigation duration of the timed irrigation plan.

In addition, the irrigation controller has a built-in high-precision flow sensor, the flow sensor automatically records the water consumption amount per irrigation and the accumulated water consumption amount per irrigation.

The wifi smart gateway monitors the operating state of the device through the flow sensor, and when an abnormal flow caused by a valve not being normally closed is found, the wifi smart gateway sends a warning message to the mobile phone APP of a manager.

In addition, the radio frequency communication is based on the low-power radio frequency communication technology, and a low-power radio frequency communication module is used. The low-power radio frequency communication module is a RF433 radio frequency module, a LoRa module, a zigbee module, or a NB-LOT module.

The advantages of the present invention are exemplified as follows:

1. Since the wifi device in the prior art consumes a large amount of power, external power supply must be used. Therefore, it is necessary to place a power supply plug near the water supply. On the one hand, there are more restrictions on the installation environment, and on the other hand, the distance between the water and the socket is relatively close, so there are major security risks. The technology used in the present invention is a low-power radio frequency networking technology, and the high-power wifi device is placed indoors with an external power supply, and the low-power irrigation controller, soil temperature and humidity sensors, air temperature, humidity, and pressure sensors, and rainfall information sensor are battery-powered and can be placed anywhere in the outdoor. Moreover, the low-frequency RF communication is used, so the system of the invention has strong penetration, large transmission distance and coverage range.

2. Some irrigation controllers in the prior art can only be connected to the soil temperature and humidity sensors by wires, so the installation location of the soil temperature and humidity sensors must be limited to the periphery of the irrigation controller. Some irrigation controllers in the prior art can only obtain online meteorological information, which is different from the actual climate of the irrigation zone. The system of the invention can select all or part of the sensors such as the soil temperature and humidity sensors, the air temperature, humidity, and pressure sensors, the rainfall information sensor, etc., and obtain real-time weather information and soil information of the irrigation zone. The sensors uses the radio frequency communication and has no restrictions on the installation location. All weather information and soil information can be cached on the wifi smart gateway for the irrigation controller to determine the execution of the irrigation plan.

There is no way to introduce real-time meteorological information and soil information for linkage control in the linkage mechanism of existing APP. By the present invention, in the APP intelligent scene, according to the meteorological information and the soil information the working time of each irrigation can be automatically adjusted.

In the invention, since the soil factor decision module can directly generate soil irrigation decision, the air factor decision module can directly generate weather forecast, and directly push the soil irrigation decision result and the weather forecast result in the standard data format to the decision module through the wireless network data interface, so it greatly simplifies the design difficulty of the decision module, reduces the computational amounts of the irrigation decision module, reduces the data transmission volume, and reduces the data transfer of the low-power wireless network in the low-bandwidth network environment. Moreover, since the soil irrigation decisions and the weather forecasts are based on small climates in small zone, irrigation operations can be closer to the actual environment of the production site.

Due to the local and real-time meteorological information and soil information, the system of the present invention is more suitable for the current irrigation environment than the prior art that acquires the meteorological information on the Internet, and can accurately achieve the purpose of water saving and ensures the water needed for plant growth.

BRIEF DESCRIPTION OF THE DRAWINGS

The present invention is further described in detail below with reference to the accompanying drawings and specific embodiments.

DESCRIPTION OF THE INVENTION

Figure 1:
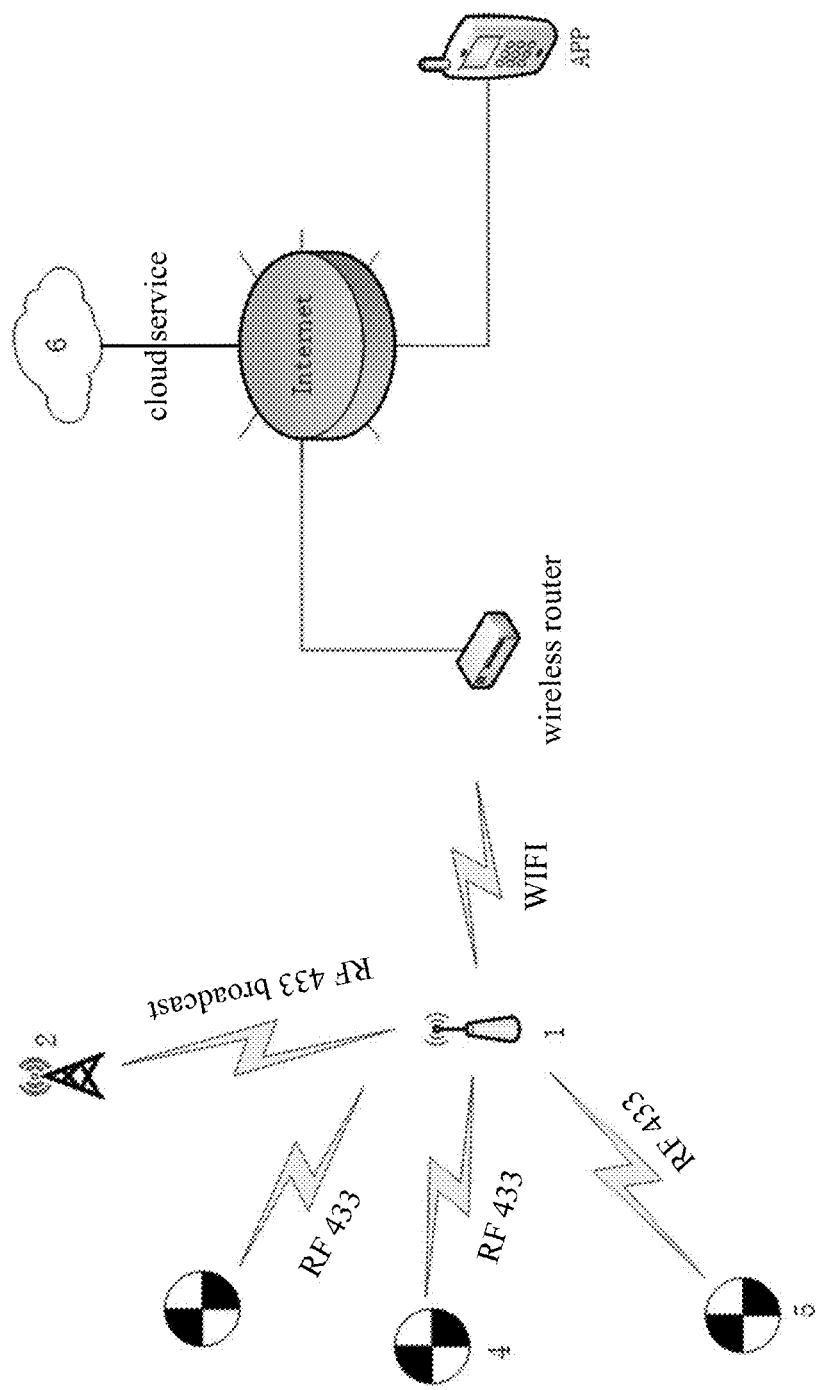
FIG. 1 is a schematic view of the principle of the present invention.
Figure 2:
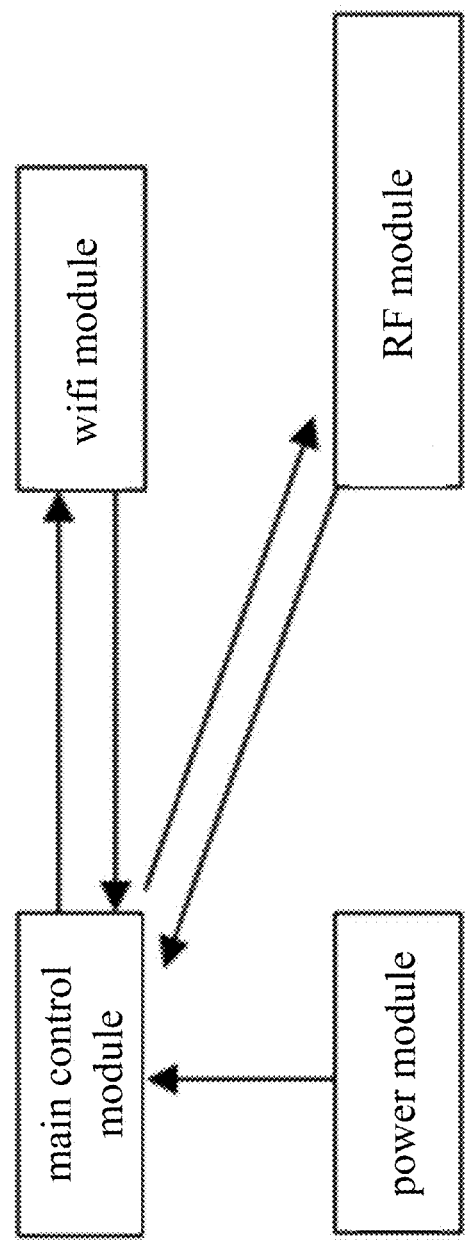
FIG. 2 is a schematic diagram of the principle of a wifi smart gateway.
Figure 3:
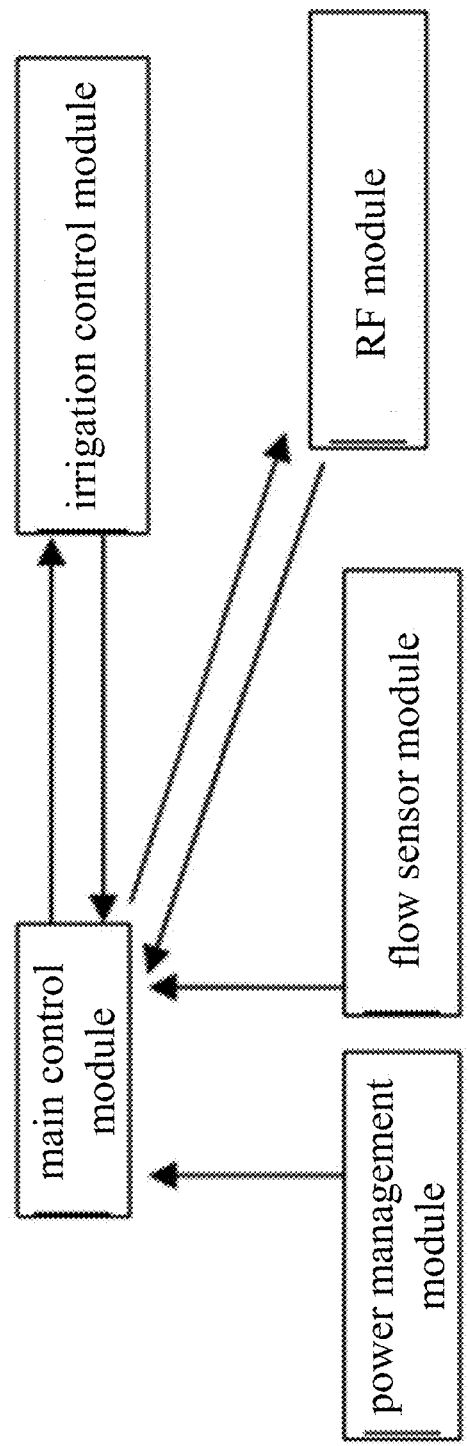
FIG. 3 is a schematic diagram of the principle of the irrigation controller.
Figure 4:
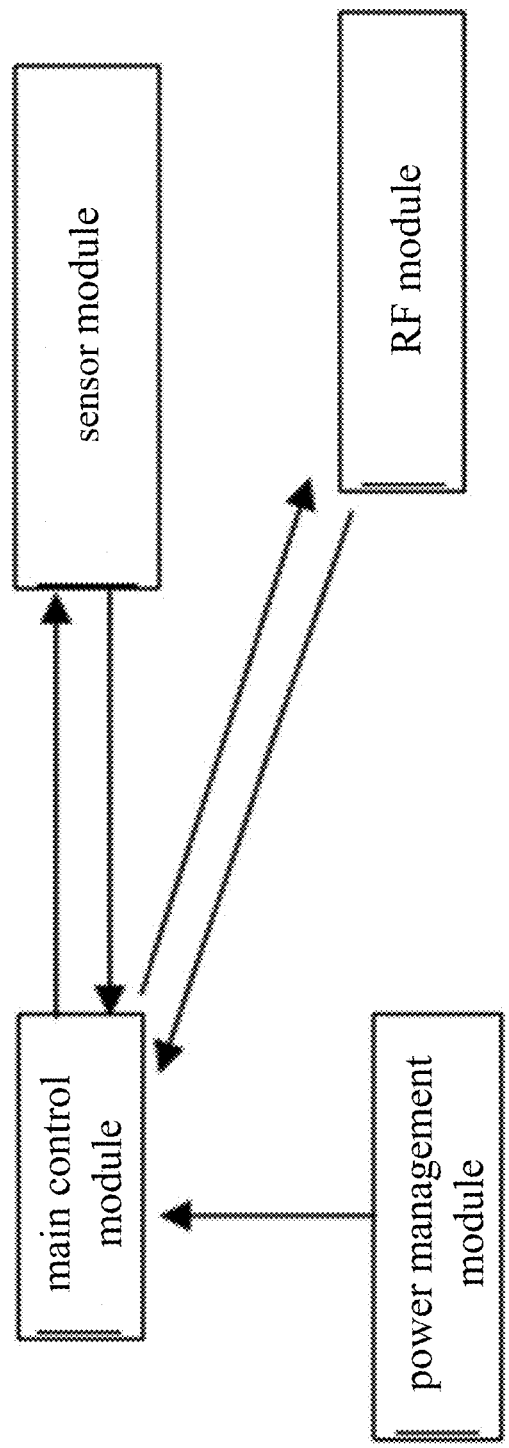
FIG. 4 is a schematic diagram of the principle of various types of sensors in the present invention.
Figure 5:
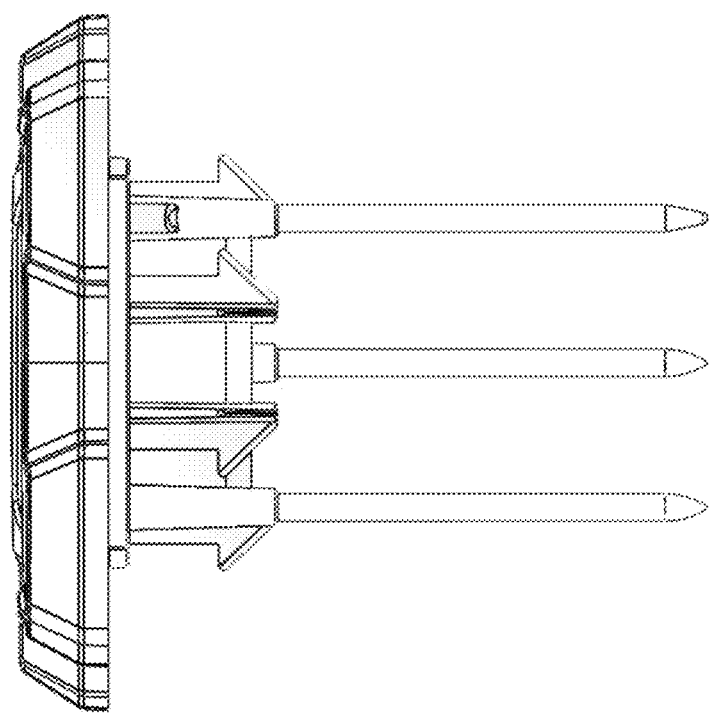
FIG. 5 is a schematic diagram of the soil factor decision module.
Figure 6:
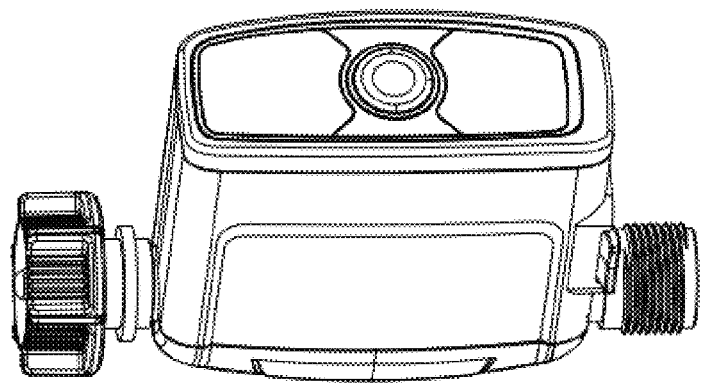
FIG. 6 is a schematic view of the irrigation controller.
Figure 7:
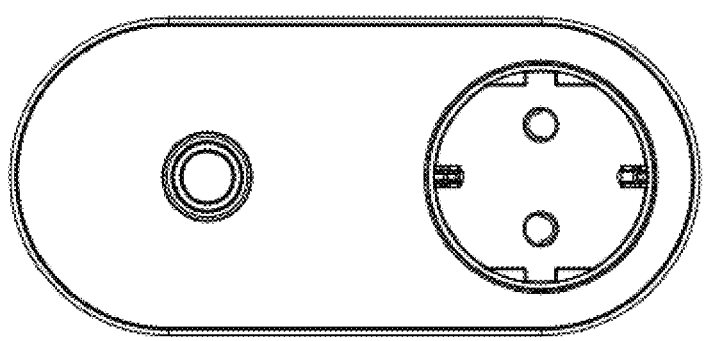
FIG. 7 is a schematic diagram of the wifi smart gateway.

As shown in FIGS. 1-7, a low-power intelligent irrigation system based on radio frequency networking technology is provided. The irrigation system includes an irrigation decision module, an irrigation controller 5 disposed in an irrigation zone, a soil factor decision module 3, an air factor decision module 4; the soil factor decision module 3 submits a soil irrigation decision to the irrigation decision module based on a soil state in the irrigation zone; the air factor decision module 4 submits a weather forecast to the irrigation decision module according to an air state in the irrigation zone; the irrigation decision module is connected to the rainfall information sensor to receive current rainfall; the irrigation decision module determines whether to initiate irrigation operations in the irrigation zone based on the received soil irrigation decisions and the weather forecasts.

The irrigation system further comprises a rainfall information sensor 2; the irrigation decision module, the irrigation controller, the soil factor decision module, and the air factor decision module and the rain information sensor form a wireless communication network by radio frequency communication.

The irrigation system further comprises a rainfall information sensor; the irrigation decision module is connected to the rainfall information sensor to receive current rainfall.

The irrigation decision module includes a wifi smart gateway 1 having a built-in data buffer.

The soil factor decision module includes a soil temperature sensor, a soil moisture sensor, and a wireless communication module; the air factor decision module includes an air temperature sensor, an air humidity sensor, and an air pressure sensor; the air factor decision module monitors and records air temperature, air humidity, and air pressure in the irrigation zone as monitoring data; the air factor decision module generates the weather forecast by analyzing the recorded monitoring data.

The irrigation controller has a built-in timed irrigation plan.

When the soil moisture in the irrigation zone exceeds an irrigation threshold value, the soil factor decision module submits a soil irrigation decision and soil moisture data to the wifi intelligent gateway, so that the wifi intelligent gateway marks an irrigation zone watering identifier as a no-irrigation zone in the built-in data buffer.

When the soil moisture in the irrigation zone does not exceed the irrigation threshold value, the soil factor decision module submits the soil irrigation decision and soil moisture data to the wifi intelligent gateway, so that the wifi intelligent gateway marks the irrigation zone watering identifier as an allowed irrigation zone in the built-in data buffer.

The weather forecast submitted by the air factor decision module to the irrigation decision module includes current air temperature, current air humidity, current air pressure, and rain forecast indicator of the irrigation zone.

The wifi smart gateway caches the weather forecasts, the current rainfall, the soil moisture data, and the soil irrigation decisions; the irrigation controller have a built-in timed irrigation plan.

A settable value of the rain forecast indicator includes sunny within 6 to 24 hours or stormy within 6 to 24 hours; when the air factor decision module detects that an ambient humidity of the irrigation zone is less than 40% for six hours, the air factor decision module sets the rain forecast indicator in the submitted weather forecast to be sunny within 6 to 24 hours.

When the air factor decision module detects that an ambient air pressure in the irrigation zone has dropped by more than 3 hPa within six hours, the air factor decision module sets the weather forecast indicator in the submitted weather forecast to stormy within 6 to 24 hours.

When the rain forecast indicator in the weather forecast is sunny, the wifi smart gateway does not consider the soil moisture data and the content of the soil irrigation decision, when a timed task of the timed irrigation plan reaches an execution time, it sends an instruction to the irrigation controller to start watering operation.

When the rain forecast indicator in the weather forecast is stormy, if the irrigation zone watering identifier is the allowed irrigation zone, when the timed task of the timed irrigation plan reaches the execution time, the wifi intelligent gateway sends an instruction to the irrigation controller to start watering operation.

When the rain forecast indicator in the weather forecast is stormy, if the irrigation zone watering identifier is the no-irrigation zone, when the timed task of the timed irrigation plan reaches the execution time, the wifi intelligent gateway sends an instruction to the irrigation controller to not implement the current timed irrigation plan.

When the wifi smart gateway detects that the current rainfall exceeds 10 mm by the rain information sensor, when the timed task of the timed irrigation plan reaches the execution time, the wifi smart gateway sends an instruction to the irrigation controller to not execute the current timed irrigation plan.

In addition, the wifi smart gateway is connected to a cloud platform of an Internet, and uploads the cached weather forecast, current rainfall, soil moisture data and soil irrigation decisions to the cloud platform to form storage data.

The storage data further includes an irrigation state, an irrigation plan, a water consumption amount per irrigation, weather information, and soil state information; the storage data of the cloud platform is configured to be remotely viewed through a mobile phone APP.

The mobile phone APP is provided with an interactive interface for adjusting the irrigation duration of the timed irrigation plan.

The irrigation controller has a built-in high-precision flow sensor, the flow sensor automatically records the water consumption amount per irrigation and the accumulated water consumption amount per irrigation.

The wifi smart gateway monitors the operating state of the device through the flow sensor, and when an abnormal flow caused by a valve not being normally closed is found, the wifi smart gateway sends a warning message to the mobile phone APP of a manager.

The radio frequency communication is based on the low-power radio frequency communication technology, and a low-power radio frequency communication module is used. The low-power radio frequency communication module is a RF433 radio frequency module, a LoRa module, a zigbee module, or a NB-LOT module.

Embodiment

The wifi intelligent gateway of the invention can upload the cached local meteorological information, soil information and rainfall information to the cloud platform, and the user can connect to the cloud platform through the mobile APP to remotely view the irrigation state, set the irrigation plan, view the water consumption per irrigation, and view meteorological information and soil information.

In the intelligent scene, the APP of the present invention is used for interaction interface, the execution condition is settable. For example, when the weather forecast is clear and the current humidity is less than the set table. value on the APP interface, the irrigation time can be increased by 30%, or when the rainfall is more than 3 mm and less than 7 mm the irrigation time can be reduced by 50%. On the one hand, the water required for plant growth is ensured, and on the other hand the purpose of water saving is achieved.

In this embodiment, the soil factor decision module and the air factor decision module all have built-in MCUs as a main control module for analyzing data.

Although the above embodiments have been described, those skilled in the art can make other changes and modifications to these embodiments once they have learned the basic inventive concept. Therefore, the above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

What is claimed is:

1. An intelligent irrigation system configured to receive and process meteorological information in order to execute an irrigation plan, the irrigation system consisting of:
   an irrigation decision module;
   a soil factor decision module, wherein the soil factor decision module further consists of:
      a soil temperature sensor;
      a soil humidity sensor; and
      a wireless communication module;
   an air factor decision module, wherein the air factor decision module further consists of:
      an air temperature sensor;
      an air humidity sensor; and
      an air pressure sensor;
   a rainfall information sensor;
   a Wi-Fi smart gateway;
   a cloud platform to process and store the meteorological information, wherein the Wi-Fi smart gateway is connected to the cloud platform and uploads weather forecast, rainfall, soil moisture data and soil irrigation decisions to the cloud platform to generate storage data;
   an irrigation controller, wherein the irrigation controller controls water flow via a flow sensor; and
   a mobile phone application, wherein the mobile phone application is in data communication with the irrigation decision module;
   wherein the soil decision module monitors and records a soil temperature and soil moisture at an irrigation area to submit a soil irrigation decision to the irrigation decision module;
   wherein the air factor decision module monitors and records air temperature, air humidity, and air pressure at the irrigation area to produce weather forecasts; and
   wherein the irrigation decision module, the soil factor decision module, the air decision module, the irrigation controller, the rainfall information sensor, and the Wi-Fi smart gateway form a wireless communication network via radio frequency communication.

* * * * *